United States Patent
Spiegelman et al.

(10) Patent No.: US 11,029,592 B2
(45) Date of Patent: Jun. 8, 2021

(54) REAR PROJECTION SIMULATOR WITH FREEFORM FOLD MIRROR

(71) Applicant: FlightSafety International, Flushing, NY (US)

(72) Inventors: Adam Kristopher Spiegelman, The Hills, TX (US); Justin King Knaplund, The Hills, TX (US)

(73) Assignee: FLIGHTSAFETY INTERNATIONAL INC., Melville, NY (US)

( * ) Notice: Subject to any disclaimer, the term of this patent is extended or adjusted under 35 U.S.C. 154(b) by 0 days.

(21) Appl. No.: 16/689,866

(22) Filed: Nov. 20, 2019

(65) Prior Publication Data

US 2020/0159104 A1    May 21, 2020

Related U.S. Application Data

(60) Provisional application No. 62/769,667, filed on Nov. 20, 2018.

(51) Int. Cl.
  *G02B 27/18*   (2006.01)
  *G03B 21/14*   (2006.01)
  (Continued)

(52) U.S. Cl.
  CPC ......... *G03B 21/602* (2013.01); *G02B 3/0031* (2013.01); *G02B 3/0056* (2013.01);
  (Continued)

(58) Field of Classification Search
  CPC .. G03B 21/625; G02B 3/0056; G02B 3/0031; G02B 3/08; G02B 5/0278
  (Continued)

(56) References Cited

U.S. PATENT DOCUMENTS 12,003 A  *  11/1854  Shirley ................... G10C 3/22
                                                   84/236
2,482,115 A  *  9/1949  Laird, Jr. ............... G02B 30/56
                                                   353/99
(Continued)

FOREIGN PATENT DOCUMENTS

CN   103080832   5/2013
CN   105005174   10/2015
(Continued)

OTHER PUBLICATIONS

Sieler M. et al, Microoptical array projectors for free-form screen applications, Optical Society of America,, Nov. 18, 2013 I vol. 21, No. 23, 9 pages (Year: 2013).*

(Continued)

*Primary Examiner* — Clayton E. LaBalle
*Assistant Examiner* — Kevin C Butler
(74) *Attorney, Agent, or Firm* — Sheridan Ross P.C.

(57) ABSTRACT

The present invention provides a rear projection simulator system with a free-form fold mirror. The system includes a high definition projector and a curved screen. The free-form fold mirror is interposed between the projector and the screen. The free-form fold mirror includes one or more non-planar (e.g., curved) portions to eliminate or reduce loss of resolution of the projected image near the edges or boundaries of the image.

30 Claims, 6 Drawing Sheets

(51) Int. Cl.
  *G02B 3/00*    (2006.01)
  *G02B 3/08*    (2006.01)
  *G02B 5/02*    (2006.01)
  *G03B 21/625*  (2014.01)
  *G02B 27/01*   (2006.01)
  *G03B 21/602*  (2014.01)

(52) U.S. Cl.
  CPC .............. *G02B 3/08* (2013.01); *G02B 5/0278* (2013.01); *G02B 27/18* (2013.01); *G03B 21/145* (2013.01); *G03B 21/625* (2013.01); *G02B 27/0101* (2013.01)

(58) Field of Classification Search
  USPC ........................................................ 359/456
  See application file for complete search history.

(56) References Cited

U.S. PATENT DOCUMENTS

| | | | | |
|---|---|---|---|---|
| 2,731,883 | A * | 1/1956 | Köhler et al. | G02B 13/08 359/671 |
| 4,129,365 | A * | 12/1978 | Aversano | G03B 21/00 353/30 |
| 4,234,891 | A * | 11/1980 | Beck | G02B 13/08 348/121 |
| 4,773,748 | A * | 9/1988 | Shih | G02B 26/06 355/52 |
| 4,964,718 | A * | 10/1990 | Van Hoogstrate | G02B 26/0875 353/122 |
| 4,971,436 | A * | 11/1990 | Aoki | G09F 19/18 353/31 |
| 5,762,413 | A * | 6/1998 | Colucci | G09F 19/18 352/69 |
| 6,042,238 | A * | 3/2000 | Blackham | G03B 37/04 353/30 |
| 6,231,189 | B1 * | 5/2001 | Colucci | G09F 19/18 353/122 |
| 6,530,667 | B1 * | 3/2003 | Idaszak | G09B 9/32 348/121 |
| 6,590,606 | B1 * | 7/2003 | Hiller | H04N 9/3129 348/203 |
| 6,610,974 | B1 * | 8/2003 | Hunt | G02B 6/3564 250/227.14 |
| 6,631,842 | B1 * | 10/2003 | Tsikos | B82Y 15/00 235/454 |
| 6,848,792 | B1 * | 2/2005 | De Meerleer | G06F 3/1446 348/E5.104 |
| 7,009,782 | B2 * | 3/2006 | Sekiyama | G02B 7/08 359/680 |
| 7,012,669 | B2 * | 3/2006 | Streid | G03B 21/32 352/69 |
| 7,347,567 | B2 * | 3/2008 | Deter | G02B 13/16 353/79 |
| 7,535,648 | B2 * | 5/2009 | Yoshikawa | G03B 21/10 353/101 |
| 7,755,842 | B2 * | 7/2010 | Rutzen | G01J 3/02 359/668 |
| 7,766,483 | B2 * | 8/2010 | Balu | G03B 21/10 353/7 |
| 8,194,193 | B2 * | 6/2012 | Streid | G09B 9/08 348/744 |
| 8,587,497 | B2 | 11/2013 | Streid et al. | |
| 9,110,358 | B1 * | 8/2015 | Vorst | G09B 9/02 |
| 9,188,850 | B2 * | 11/2015 | Turner | G03B 21/56 |
| 9,229,300 | B2 * | 1/2016 | Hellin | G02B 7/026 |
| 9,436,068 | B2 * | 9/2016 | Hauquitz | G03B 21/10 |
| 9,788,388 | B2 * | 10/2017 | Ooghe | H05B 45/22 |
| 9,933,697 | B2 * | 4/2018 | Lambot | G02B 27/149 |
| 2003/0147057 | A1 | 8/2003 | Idaszak et al. | |
| 2003/0194683 | A1 | 10/2003 | Vorst | |
| 2004/0141157 | A1 * | 7/2004 | Ramachandran | G03B 21/10 353/70 |
| 2004/0212582 | A1 * | 10/2004 | Thielemans | G09F 9/37 345/107 |
| 2005/0030267 | A1 | 2/2005 | Tanghe et al. | |
| 2005/0099608 | A1 | 5/2005 | Matthys et al. | |
| 2005/0117121 | A1 | 6/2005 | De Meerleer | |
| 2005/0134525 | A1 | 6/2005 | Tanghe et al. | |
| 2005/0157275 | A1 | 7/2005 | Colpaert | |
| 2005/0185143 | A1 | 8/2005 | Van Den Bossche et al. | |
| 2005/0185145 | A1 | 8/2005 | Halsberghe et al. | |
| 2006/0132403 | A1 | 6/2006 | Maximus et al. | |
| 2006/0132910 | A1 | 6/2006 | Defever et al. | |
| 2006/0227416 | A1 | 10/2006 | Balu et al. | |
| 2007/0120763 | A1 | 5/2007 | De Paepe et al. | |
| 2007/0126657 | A1 | 6/2007 | Kimpe | |
| 2007/0165162 | A1 | 7/2007 | Meersman et al. | |
| 2007/0229394 | A1 | 10/2007 | Ishikawa et al. | |
| 2008/0123062 | A1 | 5/2008 | Morikuni | |
| 2008/0186415 | A1 | 8/2008 | Boud et al. | |
| 2008/0284988 | A1 * | 11/2008 | Kobayashi | G03B 21/28 353/99 |
| 2009/0040133 | A1 | 2/2009 | Clodfelter | |
| 2009/0066919 | A1 * | 3/2009 | Fujita | G03B 21/28 353/98 |
| 2009/0102915 | A1 | 4/2009 | Arsenich | |
| 2009/0153808 | A1 * | 6/2009 | Benitez | G02B 19/0047 353/99 |
| 2009/0266958 | A1 | 10/2009 | Meersman et al. | |
| 2010/0182769 | A1 | 7/2010 | Meersman | |
| 2010/0202047 | A1 | 8/2010 | Maximus et al. | |
| 2010/0277816 | A1 | 11/2010 | Kweon et al. | |
| 2011/0242074 | A1 | 10/2011 | Bert et al. | |
| 2013/0070339 | A1 | 3/2013 | Pretorius | |
| 2013/0120720 | A1 | 5/2013 | Hellin et al. | |
| 2014/0118818 | A1 * | 5/2014 | Nishina | G03B 21/28 359/364 |
| 2014/0354957 | A1 | 12/2014 | Vermeirsch | |
| 2015/0049310 | A1 | 2/2015 | Vermeirsch et al. | |
| 2015/0138514 | A1 * | 5/2015 | Tsuchiya | G03B 21/28 353/70 |
| 2015/0219500 | A1 | 8/2015 | Maes | |
| 2016/0104460 | A1 | 4/2016 | Kiichle-Gross et al. | |
| 2016/0253935 | A1 | 9/2016 | Gerets et al. | |
| 2016/0299417 | A1 | 10/2016 | QD | |
| 2016/0357094 | A1 * | 12/2016 | Ishii | G03B 21/208 |
| 2017/0059971 | A1 * | 3/2017 | Takano | G02B 17/0852 |
| 2017/0200386 | A1 * | 7/2017 | Smith | G06F 3/044 |
| 2017/0235138 | A1 * | 8/2017 | Morohashi | G03B 21/28 359/631 |
| 2017/0261846 | A1 | 9/2017 | Maes et al. | |
| 2017/0262020 | A1 * | 9/2017 | Patel | G02B 27/0172 |
| 2017/0287112 | A1 | 10/2017 | Stafford | |
| 2018/0113663 | A1 | 4/2018 | Jain | |
| 2018/0192017 | A1 | 7/2018 | Vandemaele et al. | |
| 2019/0081281 | A1 | 3/2019 | Chesterman et al. | |
| 2019/0235369 | A1 | 8/2019 | Janssens et al. | |
| 2020/0177850 | A1 | 6/2020 | Emig et al. | |

FOREIGN PATENT DOCUMENTS

| | | |
|---|---|---|
| DE | 19809711 | 3/1998 |
| EP | 1414239 | 4/2004 |
| EP | 1434433 | 6/2004 |
| EP | 1450568 | 8/2004 |
| EP | 1471746 | 10/2004 |
| EP | 1473687 | 11/2004 |
| EP | 1505565 | 2/2005 |
| EP | 1513060 | 3/2005 |
| EP | 1536399 | 6/2005 |
| EP | 1548573 | 6/2005 |
| EP | 1558042 | 7/2005 |
| EP | 1569463 | 8/2005 |
| EP | 1569464 | 8/2005 |
| EP | 1613072 | 1/2006 |
| EP | 1687793 | 8/2006 |
| EP | 1808840 | 7/2007 |
| EP | 1952382 | 8/2008 |
| EP | 2159783 | 3/2010 |
| EP | 2597515 | 5/2013 |

(56) References Cited

FOREIGN PATENT DOCUMENTS

| | | |
|---|---|---|
| EP | 2837968 | 2/2015 |
| EP | 2807520 | 5/2016 |
| EP | 3024176 | 5/2016 |
| EP | 3043342 | 7/2016 |
| EP | 3343547 | 7/2018 |
| EP | 3454390 | 3/2019 |
| EP | 3599495 | 1/2020 |
| GB | 2486921 | 7/2012 |
| GB | 2496534 | 10/2013 |
| KR | 10-2004-0093437 | 11/2004 |
| KR | 10-2005-0016195 | 2/2005 |
| KR | 10-2005-0025918 | 3/2005 |
| KR | 10-2005-0065396 | 6/2005 |
| KR | 10-2006-0123755 | 12/2006 |
| KR | 101121268 | 3/2012 |
| WO | WO 2005/052902 | 6/2005 |
| WO | WO 2007/059965 | 5/2007 |
| WO | WO 2008/155366 | 12/2008 |
| WO | WO 2009/010500 | 1/2009 |
| WO | WO 2010/023270 | 3/2010 |
| WO | WO 2012/013675 | 2/2012 |
| WO | WO 2012/089849 | 7/2012 |
| WO | WO 2013/104430 | 7/2013 |
| WO | WO 2013/164015 | 11/2013 |
| WO | WO 2014/041464 | 3/2014 |
| WO | WO 2015/063273 | 5/2015 |
| WO | WO 2015/082529 | 6/2015 |
| WO | WO 2015/149877 | 10/2015 |
| WO | WO 2016/061174 | 4/2016 |
| WO | WO 2016/166183 | 10/2016 |
| WO | WO 2017/178519 | 10/2017 |
| WO | WO 2018/011059 | 1/2018 |
| WO | WO 2018/019369 | 2/2018 |
| WO | WO 2018/020035 | 2/2018 |
| WO | WO 2018/122300 | 7/2018 |
| WO | WO 2018/141407 | 8/2018 |
| WO | WO 2019/020725 | 1/2019 |
| WO | WO 2019/185949 | 10/2019 |

OTHER PUBLICATIONS

M Sieler et al, Microoptical array projectors for free-form screen applications, Optical Society of America—OSA, vol. 21 No. 23, Nov. 14, 2014, 9 pages (Year: 2014).*
U.S. International Searching Authority, PCT International Search Report and Written Opinion; dated Feb. 7, 2020, pp. 1-12.
U.S. Appl. No. 11/037,008, filed Oct. 23, 2007, Colpaert et al.
"Constant Resolution Visual System Family of Products," The Boeing Company, Date Unknown, retrieved from https://www.boeing.com/defense/support/training/constant-resolution-visual-system/, 3 pages.
"The Reality of Virtual Training," The Boeing Company, Aug. 10, 2015, retrieved from https://www.boeing.com/features/2015/08/bds-crvs-08-15.page, 4 pages.
"Who's Afraid of Freeform Optics," Uploaded to YouTube by Zemax LLC, Jan. 18, 2018, retrieved from https://youtu.be/9nb_B7-U16g, 2 pages.
Brix et al., "Designing Illumination Lenses and Mirrors by the Numerical Solution of Monge-Ampere Equations," arXiv, No. 1506.07670v2, dated Dec. 5, 2015, 16 pages.
Cayrel, "E-ELT Optomechanics: Overview," Proc. SPIE c84444, Ground-based and Airborne Telescopes IV, 84441X, Sep. 17, 2012, 18 pages.
Vorst et al., "Constant Resolution: A Disruptive Technology for Simulator Visual System Design," Interservice/Industry Training, Simulation, and Education Conference (I/ITSEC), Paper No. 12030, 2012, 6 pages.
International Search Report and Written Opinion for Internationai (PCT) Patent Application No. PCT/US2019/062273, dated Feb. 3, 2020, 31 pages.

* cited by examiner

REAR PROJECTION SIMULATOR WITH FREEFORM FOLD MIRROR

CROSS-REFERENCE TO RELATED APPLICATIONS

The present invention claims priority to and the benefit of U.S. Provisional Patent Application No. 62/769,667 filed Nov. 20, 2018, the contents of which are incorporated herein by reference and made a part hereof.

FEDERALLY SPONSORED RESEARCH OR DEVELOPMENT

N/A

BACKGROUND

Field

The present invention is directed to a rear projection simulator display system with a free-form folding mirror interposed between a projector and a screen.

Background of Art

A simulator, such as a flight simulator, typically includes a projector and a screen. One using the simulator is positioned in front of the screen with a variety of controls which allow for virtual training. A "fold mirror" is often used in such systems to reduce floor space or ceiling height of the system. This is accomplished by reflecting light traveling to the back of the screen from the projector. Such fold mirrors are typically flat (i.e., planar). However, use of a flat mirror, with expanding/diverging light rays from a projector on a non-flat screen, can result in uneven resolution and brightness of the image as viewed by the user of the system. This is particularly evident near the edge or boundary of the projected image.

The present invention provides an improved system using a fold mirror that corrects or reduces any loss of resolution or brightness.

SUMMARY

The present invention provides an improved rear projection display system used for simulators (e.g., a flight simulator). The system utilizes a fold mirror having one or more non-planar portions shaped so that the projector light cone will result in a more uniform display performance. This type of mirror will be referred to herein as a "free-form" fold mirror. For one implementation of the technology as disclosed and claimed herein, the free-form fold mirror is shaped to reduce or remove the loss of resolution of image components near the boundaries of the projected light cone. Freeform Optical surfaces are defined as any non-rotationally symmetric surface or a symmetric surface that is rotated about any axis that is not its axis of symmetry. These surfaces lead to a smaller system size as compared to rotationally symmetric surfaces. The free-form mirror when illuminated by a point light source produces a given illumination pattern on a target surface that is flat, spherical or of other shape. For one method of accomplishing the design, the optical ray mapping can be modeled by second order partial differential equations. For another method for accomplishing the design, an approximation of the optical surfaces is modeled and validated through ray tracing and design of the optical surfaces, particularly the free form mirror can be determined.

In accordance with one aspect of the invention, a simulator projection system is provided. The system comprises a projector and a display screen for receiving images from the projector. A free-form fold mirror is interposed between the projector and the display screen. The free-form mirror includes a first curved portion and a first flat portion. For one implementation the first curved portion is positioned to affect an edge or boundary portion of an image projected by the projector.

For one implementation, in addition to the first curved portion, the free-form mirror includes a second curved portion spaced from the first curved portion. In this arrangement, the first flat portion is between the first curved portion and the second curved portion. Additional curved portions can be added as desired or necessary, however, a flat portion need not be between two curved portions, whereby two or more curved portions are immediately adjacent without a flat portion there between.

For one implementation, the first curved portion has a concave cross-sectional shape with respect to the display screen and the projector. The second curved portion has a convex cross-sectional shape with respect to the display screen and the projector.

The projector in the system is configured to project a high definition image. For example, the high definition image can be a 1920×1080 pixel array. Arrays of higher or lower pixel counts are also used.

For one implementation of the technology the display screen of the system is curved. Typically, the convex side receives the projected image and the user is on the concave side of the screen. In some instances, flat screens can be used.

In accordance with another aspect of the invention, a display system is provided. The display system comprises a projector for projecting images and a screen for receiving images from the projector. A free-form fold mirror is interposed between the projector and the screen. The free-form fold mirror has a centrally positioned first flat portion, a first curved portion adjacent a top edge of the first flat portion and a second curved portion adjacent a bottom edge of the first flat portion.

For one implementation, the first curved portion is formed to have a concave cross-sectional shape with respect to a rear surface of the screen. The second curved portion is formed to have a convex cross-sectional shape with respect to the rear surface of the screen.

For one implementation, the free-form fold mirror can further include a second flat portion where the first curved portion is between the first flat portion and the second flat portion. Additionally, the free-form fold mirror can further include a third flat portion where the second curved portion is between the first flat portion and the third flat portion.

The system can further include a support frame. The support frame can be connected to each of the projector, the screen and the free-form fold mirror.

One objective Free Form Mirror technology is to equalize the size and spacing of projector pixels to create uniform resolution so the appearance of the image is consistently sharp. Any geometric corrections, such as pre-distorting a square to have a "barrel" shape so that it looks square to the observer instead of having the corners look elongated, will be done by the Image Generator creating the image, and not by the mirror. Prior technologies have not addressed uniform resolution. Another objective of the technology is to provide a fold mirror that creates a uniform pixel density (therefore uniform resolution & more uniform brightness) on any screen surface.

One methodology to achieve this mapping technology is accomplished using "constraints" set up in the SolidWorks CAD model. For example, the light rays expand from a single point inside the projector, and are constrained to land on the convex screen surface (for example) 0.10" apart after reflecting off of a surface. For this to occur the reflecting surface must be angled to have a "normal" (perpendicular) ray that bisects the incoming ray from the projector and the outgoing ray that must fall on a particular spot on the screen. Once the model has computed a large number of surfaces they are merged to create the free-form mirror shape. This modeling technique is one of several methodologies utilized for accomplishing the technology as disclosed and claimed herein.

For one implementation by way of illustration, the constraints of 0.10" between pixels, for example, is determined by the calculations for the pixel density required for the observer to see & measure a certain resolution. The requirement for a resolution of, for example, 10.52 arcminutes per optical line pair of pixels, results in a particular angular measurement from the observer's eye point and translates to a 0.10" distance between pixels on the screen surface if the dome has a 65" radius. The technology as disclosed and claimed herein addresses having a uniform resolution distribution, which will result in a more uniform luminance distribution, which also depends on the gain characteristics of the diffusion coating applied to the inside of the dome.

Other features and advantages of the invention will be apparent from the following specification taken in conjunction with the following Figures and Attachments.

BRIEF DESCRIPTION OF THE DRAWING

To understand the present invention, it will now be described by way of example, with reference to the accompanying drawings and attachments in which.

Figure 1:
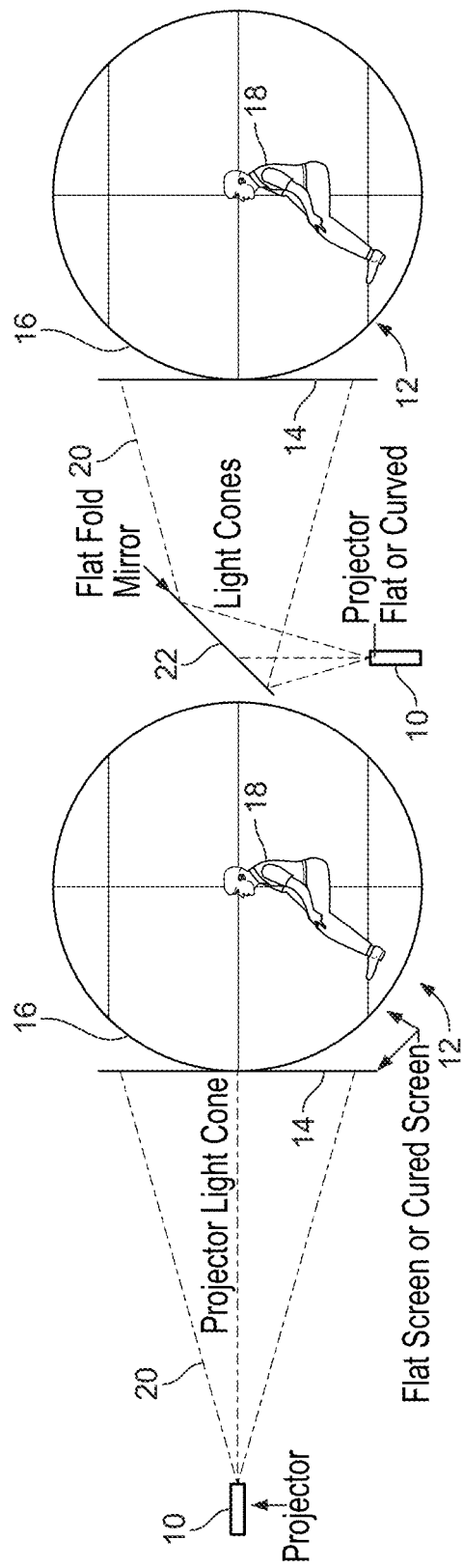
FIG. 1 is a side-by-side cross-sectional schematic representation of a simulator projection system without a mirror and one with a flat fold mirror—Comparison of Display Footprint With and Without (flat) Fold Mirror.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-6 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations. While this invention is susceptible of embodiments in many different forms, there is shown in the drawings and attachments, and will herein be described in detail preferred embodiments of the invention with the understanding that the present disclosure is to be considered as an exemplification of the principles of the invention and is not intended to limit the broad aspect of the invention to the embodiments illustrated.

The present invention provides an improved simulator display system. The system provides for a more uniform resolution of the images projected onto a simulator display, as well as a more uniform image luminance since brightness tends to increase when pixels of an image are close together. A more uniform resolution and brightness should also reduce the workload on any automatic alignment system associated with the simulator display system. The present system may also be used to further reduce the footprint and/or ceiling height of a rear projected visual display.

Referring to the left side of FIG. 1, a typical simulator display system includes an image projector 10 that projects images onto a screen 12. FIG. 1 shows both a flat screen 14 and a curved screen 16. A user 18 of the system is positioned in front of the screen 12. As illustrated in FIG. 1, the projector 10 provides an image having a light cone 20. This light cone 20 dictates, in part, the distance required between the projector 10 and the screen 12.

In order to shorten the footprint of the system, some systems have utilized a flat fold mirror 22 interposed between the projector 10 and the screen 12 as illustrated on the right side of FIG. 1. Comparing the left side to the right side, the distance between the projector 10 and the user 18 is shorter when using a fold mirror. Fold mirrors are used in a number of projection technologies to reduce the overall throw distance of the projection device so that the overall size (depth) of the system is reduced. Fold mirrors are used in embodiments as a method to reduce the overall size of device. Freeform mirrors are optics that have a non-symmetric optical surface and offer many advantages including correcting various aberrations. A freeform optic is defined as an optic whose surface shapes lack translational or rotational symmetry about axes normal to the mean plane. A common, first-effort method for designing with freeform optics is to vary all the coefficients that determine the freeform shape of each surface and let a ray-trace optimizer determine the final coefficients and surface shapes. A ray trace optimizer includes a computer based software tool for modeling the ray traces and ultimately the free form shape of the fold mirror.

Figure 2:
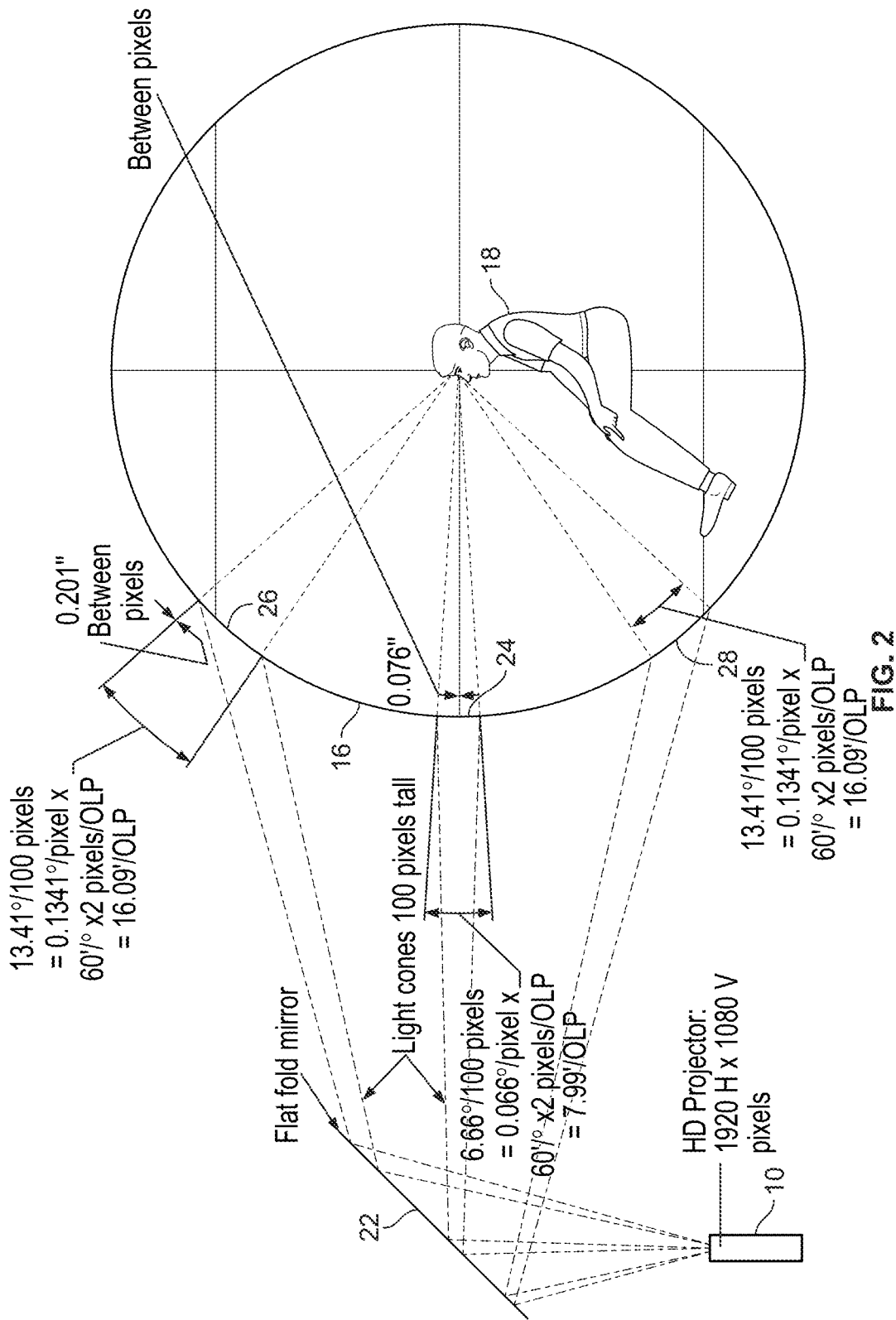
FIG. 2 is a cross-sectional schematic representation of a simulator projection system with a flat fold mirror illustrating regions of reduced screen resolution—Illustration Of Resolution Reduction Due To Expanding Light Cone and Curved Screen When Using A Flat Fold Mirror.

Certain resolution and brightness issues arise with use of a flat fold mirror. Specifically, the expanding light cone 20 from the projector 10 spreads the light rays away from the center of the image on the back of the screen 12. This is especially problematic when the screen 16 is curved as in a rear projected dome of a flight simulator as illustrated in FIG. 2. In this Figure, the screen 16 is concave on the observer/user 18 side, and convex on the projector 10 side of the screen 16. The spreading light rays combine with a screen 16 curving away from the projector to produce worsening resolution and brightness (e.g., stretching an image). As an example, a 50% reduction in resolution between the image center 24 (7.99'/OLP) and image top 26 or bottom 28 (16.09'/OLP) is shown in FIG. 2 (given in Arcminutes/Optical Line Pair ('/OLP), which is the standard measure of resolution in training simulators with visual displays). For comparison, a "20/20" visual resolution is approximately 2'/OLP, where the smaller number indicates better resolution. Each of the image center 24, top 26 and bottom 28 shown in FIG. 2 (and FIG. 3) has a light cone of 100 pixels.

Figure 3B:
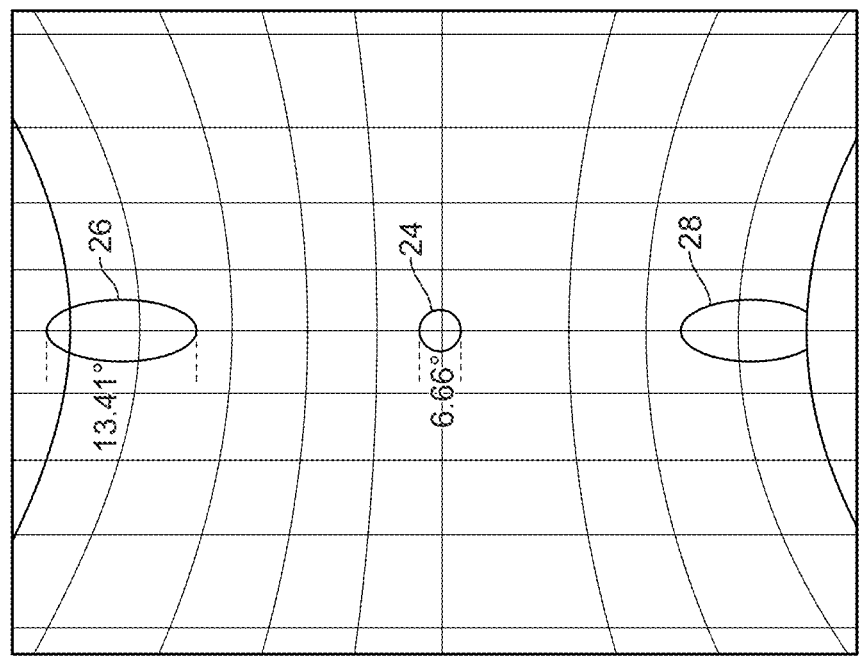
FIG. 3B is a screen view of the projected images of FIG. 3A—Illustration Of Image Stretch On Pixel Diameter Circular Image.
Figure 3A:
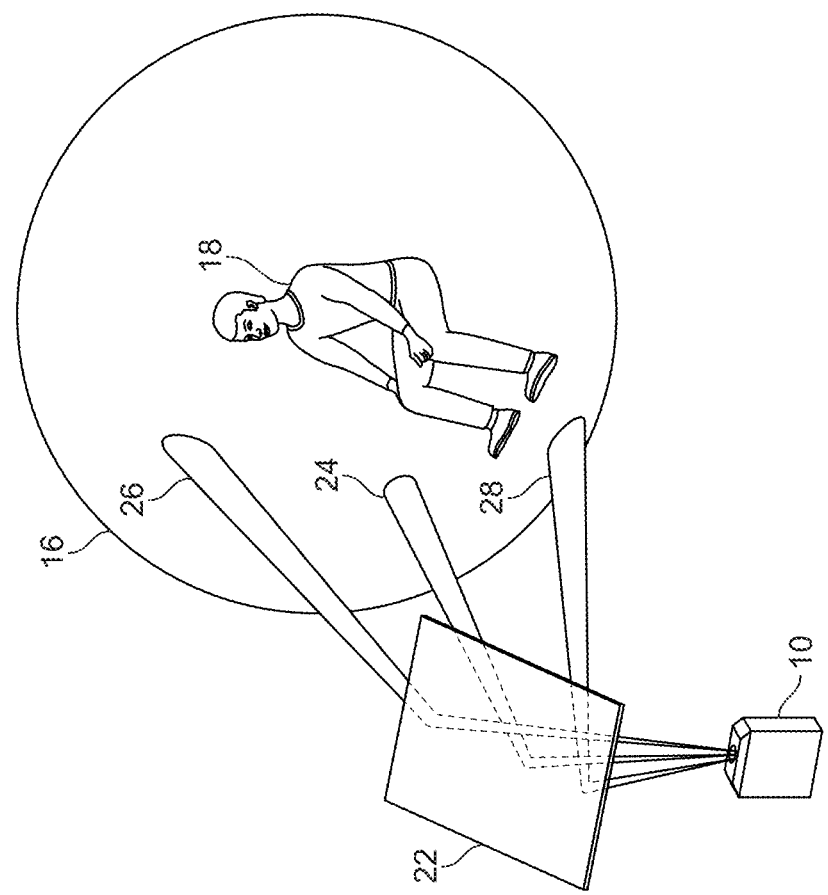
FIG. 3A is a graphical representation of circular images projected onto a screen in simulator projection system having a flat fold mirror.

There is a similar reduction in image brightness due to the spreading light rays which results in a non-uniform image luminance. This effect is more pronounced toward the edges of the image. FIG. 3, shows the effect of this image stretch from the perspective of the user 18 on a 100 pixel diameter circular object 24, 26, 28 (sun, moon, etc.) unless some image warping is applied. Such warping can only make the object circular again by using less than the original 100 pixels (thus reducing resolution of the image).

Figure 4:
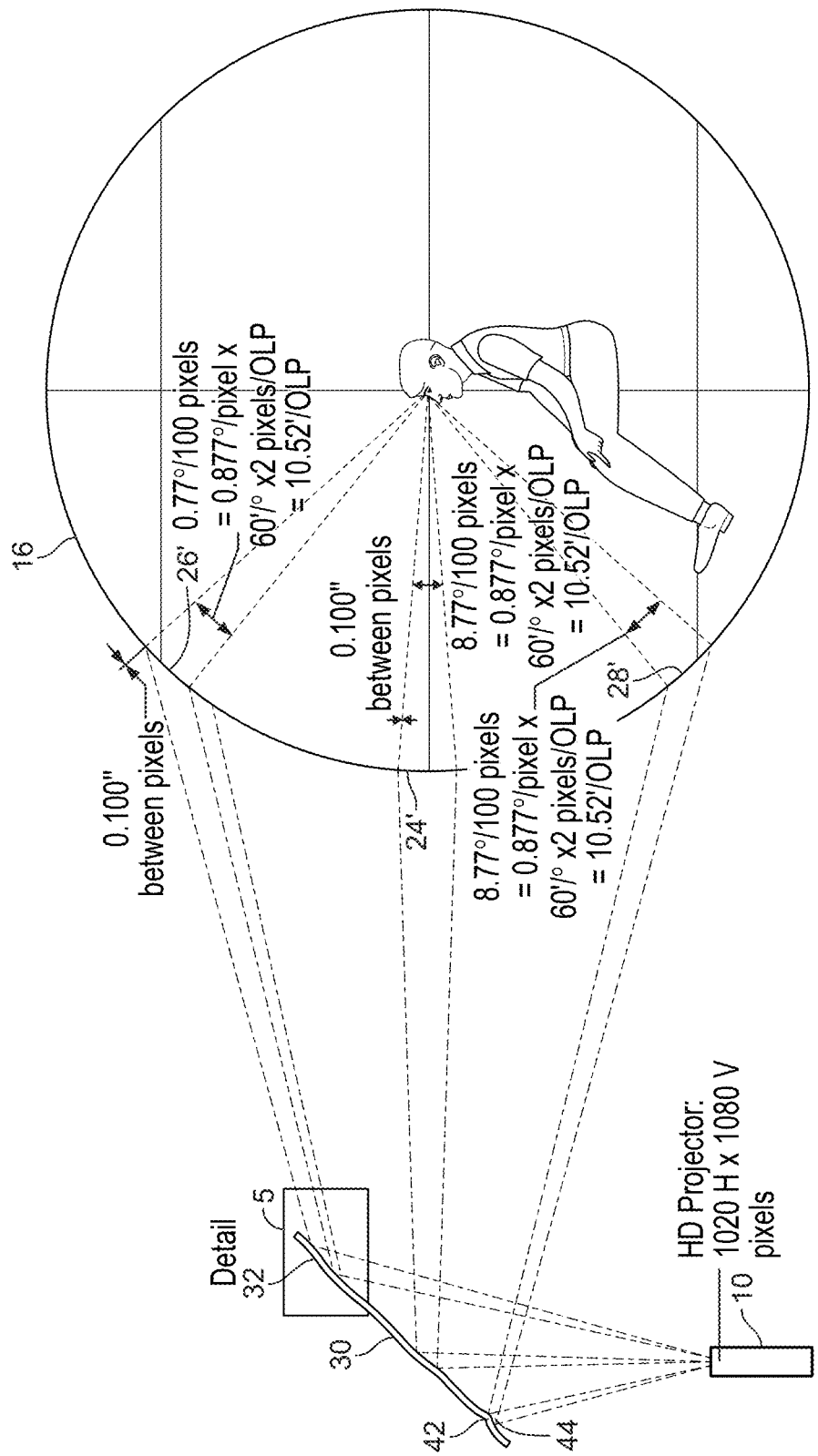
FIG. 4 is a cross-sectional schematic view of a simulator projection system with a free-form fold mirror in accordance with an aspect of the present invention—Illustration Of Free Form Mirror Used To Equalize Resolution Across Image.
Figure 5:
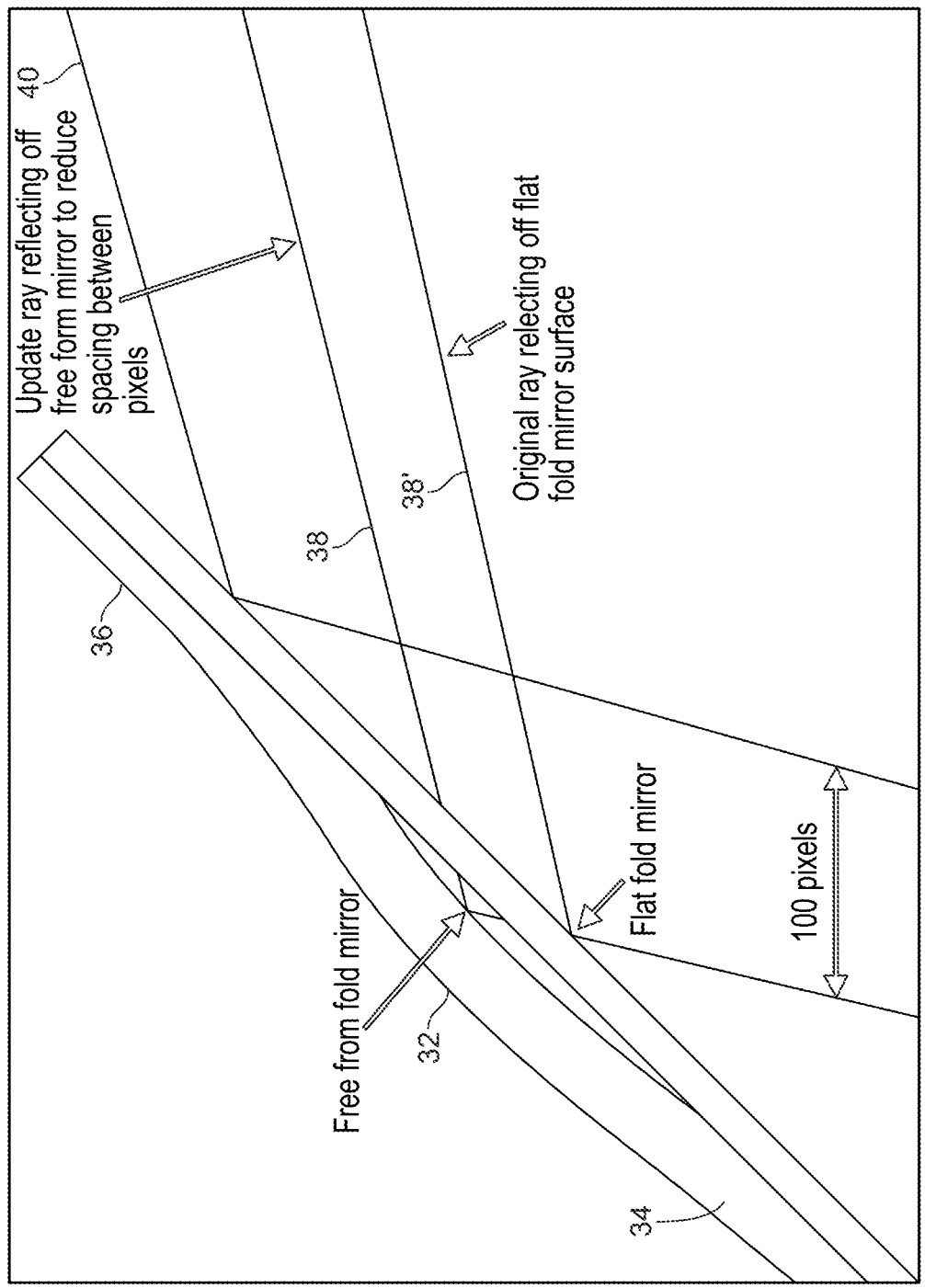
FIG. 5 is an enlarged upper portion of the free-form fold mirror of FIG. 4 with a superimposed upper portion of a flat fold mirror—Illustration Of Using Free Form Mirror On Upper Pixel Zone.

FIGS. 4 and 5 show a free-form fold mirror 30 that overcomes the problems noted with the flat fold mirror 22. The free-form fold mirror 30 described herein would adjust the distribution of the projector's light rays onto the screen 16 to equalize the resolution across the image and produce a much more uniform resolution and brightness. In the example shown in FIGS. 4 and 5, this would be accomplished by spreading the rays away from the image center and concentrating them towards the image boundaries or edges.

Focusing on the top image generated by the projector 10 in FIG. 4 (i.e., rightmost light cone), the free-form fold mirror 30 includes a first, non-planar, curved portion 32 near the top of the mirror 30 (directional or positional terms such as "top," "bottom," "right," etc. are used herein with respect to the locations or positions as shown in the Figures and are not meant to limit the invention to such locations or positions—that is the entire projector/mirror combination could be placed on its side or reversed with the projector on top—and still incorporate the invention at hand). The first curved portion 32 has a concave cross-sectional shape (i.e., with respect to the screen or the projected light cone). The free-form fold mirror 30 includes a flat portion 34 forming a central or middle portion of the mirror 30 below the first curved portion 32 and another flat portion 36 above the first curved portion 32.

As shown in more detail in FIG. 5, an outer (or leftmost) ray 38 of the light cone hitting the top portion of the free-form mirror 32 strikes the first curved portion 32 of the mirror 30 and is reflected toward the screen 16, and an inner (or rightmost) ray 40 of the light cone strikes the flat portion 36 above the first curved portion 32 and is also reflected toward the screen 16. This light cone is an upper 100 pixels of an image from the projector 10. FIG. 5 also includes a flat fold mirror 22 superimposed in front of the free-form fold mirror 30. This is done to illustrate where the outer ray 38' of the light cone would reflect if the flat fold mirror 22 were used instead of the free-form fold mirror 32. It is readily apparent that the spacing of the rays 38 and 40 from the free-form fold mirror 30 is significantly smaller than the spacing of rays 38' and 40 from the flat fold mirror 22. Accordingly, the image 26' in this area is not stretched by the free-form fold mirror 30 as much as it is stretched by the flat fold mirror 22. As illustrated in FIG. 4, each of the three images 24', 26' and 28' (from the three exemplary light cones) are 10.52'/OLP as seen by the user 18 of the system.

FIG. 4 also shows a lower image (i.e., from the leftmost light cone emitted from the projector 10) formed by striking a second, non-planar, curved portion 42 on the free-form fold mirror 30. In contrast to the first curved portion 32, the second curved portion 42 is convex with respect to the light cone and the screen 16. Another flat portion 44 is adjacent the second curved portion 42 opposite the centrally located flat portion 34.

Figure 6:
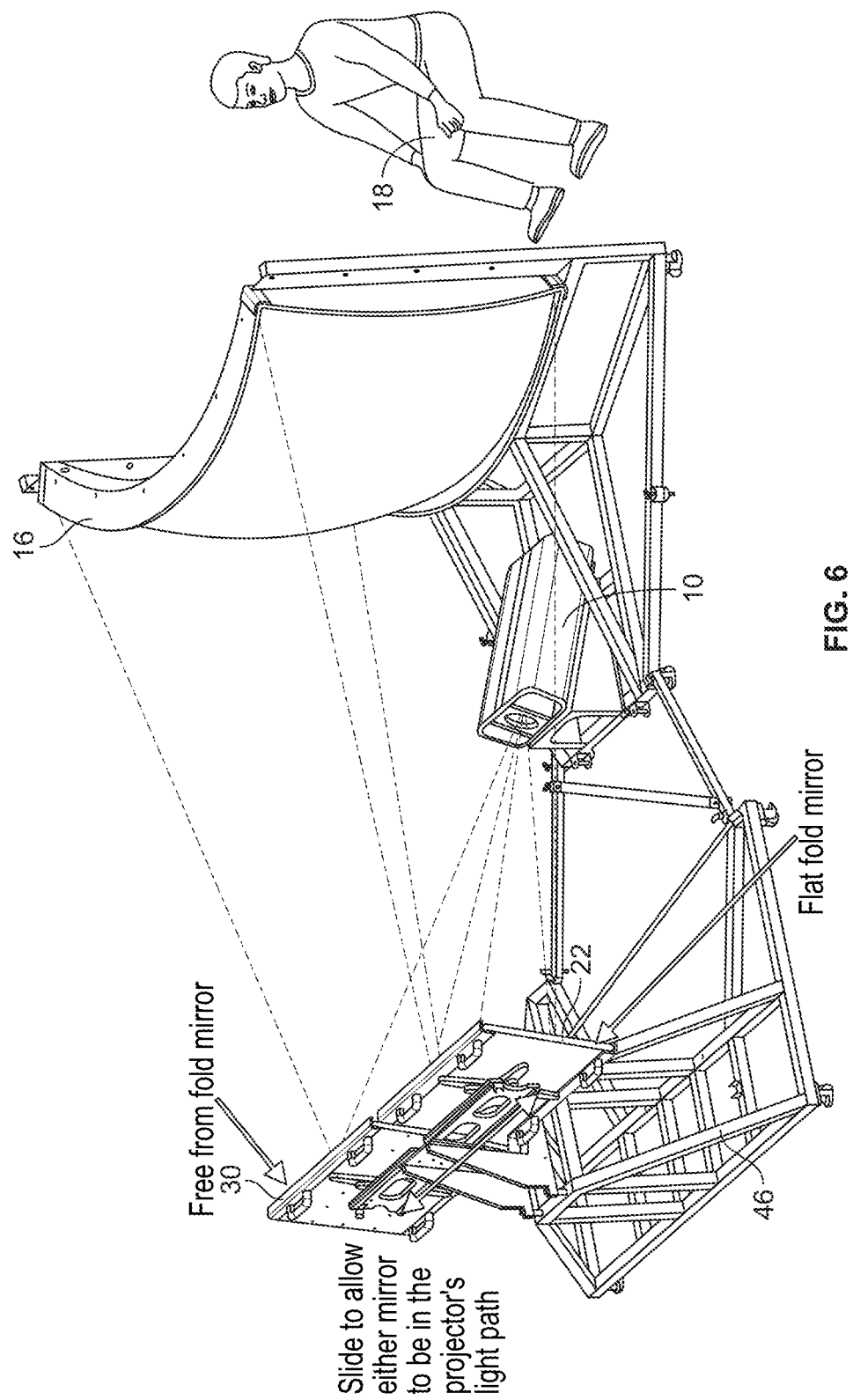
FIG. 6 is a graphical representation of a simulator projection system having both a flat fold mirror and a free-form fold mirror for comparison—Illustration Of I/ITSEC Display.

To illustrate the differences between a flat fold mirror 22 and a free-form fold mirror 30, a simulator display system having both mirrors 22, 30 is shown in FIG. 6. The two mirrors 22, 30 are both mounted to a support frame 46. The mirrors 22, 30 can slide to allow for either mirror to be in the projector's light path. The support frame 46 also holds a projector 10 and screen 16 (similar support frames are used to hold the components of the systems shown schematically in FIGS. 1-5). The entire system can be enclosed, and/or mounted on a moveable platform (that simulates movement of the airplane or other vehicle or machinery associated with the simulator).

The free-form fold mirror 30 of the present invention is a departure from the typical flat, planar mirror, and will have a more complex shape than the flat mirror. In some instances, the free-form fold mirror may be one or more mirror components connected or placed adjacent to each other.

While the free-form fold mirror 30 is shown in the Figures having two curved portions 32, 42, it can have fewer or more curved portions as necessary to provide any desired effects to the projected image. Moreover, the position and shape of the screen can affect the amount and positioning of any curved portions of such a mirror.

Many modifications and variations of the present invention are possible in light of the above teachings. It is, therefore, to be understood within the scope of the appended claims the invention may be protected otherwise than as specifically described.

The various implementations and examples shown above illustrate a method and system for a rear projection system with a freeform fold mirror. A user of the present method and system may choose any of the above implementations, or an equivalent thereof, depending upon the desired application. In this regard, it is recognized that various forms of the subject freeform fold mirror method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the and scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein. By way of illustration, for one implementation of designing manufacturing and providing for a freeform mirror, a ray trace optimizer that includes a computer based software tool for modeling the ray traces and ultimately the free form shape of the fold mirror is utilized. The freeform mirror could be pre manufactured utilizing such a computer based tool. However, for one implementation, the free form mirror is dynamically adjusted with a mechanical push/pull system that mechanically deforms the reflective surface of the mirror to the appropriate curvature. For one implementation, the push/pull mechanism is computer controlled to adjust the curvature of the mirror based on other system parameters in order to reduce aberrations and improve resolution.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various freeform fold mirror rear projection examples shown above illustrate a method and system for a rear projection system. A user of the present technology as disclosed may choose any of the above implementations, or an equivalent thereof, depending upon the desired application. In this regard, it is recognized that various forms of the subject technology could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A simulator projection system comprising:
  a projector;
  a display screen for receiving images from the projector; and
  a free-form fold mirror interposed between the projector and the display screen, the free-form mirror including a first curved portion, a second curved portion spaced from the first curved portion, and a first flat portion.

2. The simulator projection system of claim 1 further comprising a second flat portion in the free-form fold mirror, wherein the first curved portion is between the first flat portion and the second flat portion.

3. The simulator projection system of claim 1 wherein the first flat portion is between the first curved portion and the second curved portion.

4. The simulator projection system of claim 1 wherein the first curved portion has a concave cross-sectional shape with respect to the display screen.

5. The simulator projection system of claim 1 wherein the first curved portion has a concave cross-sectional shape with respect to the display screen and the second curved portion has a convex cross-sectional shape with respect to the display screen.

6. The simulator projection system of claim 1 wherein the projector is configured to project a high definition image.

7. The simulator projection system of claim 1 wherein the display screen is curved.

8. The simulator projection system of claim 1 wherein the first curved portion is positioned to affect an edge of an image from the projector.

9. The simulator projection system of claim 1 further comprising a flat fold mirror interposed between the projector and the display screen.

10. The simulator projection system of claim 9 wherein the free-form fold mirror and the flat fold mirror are slidably connected to a frame to allow for selection of one of the free-form fold mirror and the flat fold mirror.

11. A display system comprising:
a projector for projecting images;
a screen for receiving images from the projector;
a free-form fold mirror interposed between the projector and the screen, the free-form fold mirror having a centrally positioned first flat portion, a first curved portion adjacent a top edge of the first flat portion and a second curved portion adjacent a bottom edge of the first flat portion.

12. The display system of claim 11 wherein the first curved portion has a concave cross-sectional shape with respect to a rear surface of the screen.

13. The display system of claim 12 wherein the second curved portion has a convex cross-sectional shape with respect to the rear surface of the screen.

14. The display system of claim 11 further comprising a second flat portion in the free-form fold mirror, wherein the first curved portion is between the first flat portion and the second flat portion.

15. The display system of claim 14 further comprising a third flat portion in the free-form fold mirror, wherein the second curved portion is between the first flat portion and the third flat portion.

16. The display system of claim 11 further comprising a support frame connected to the projector, the screen and the free-form fold mirror.

17. The display system of claim 11 wherein the projector projects high definition images.

18. The display system of claim 11 wherein the screen is curved.

19. The display system of claim 11 wherein the screen is a flight simulator display screen.

20. A method for projecting an image on a simulator screen, comprising:
projecting an image from a projector along a projection path extending from an image projection source of the projector to a mirror intersection with a free-form fold mirror; and
reflecting the projected image from the free-form fold mirror along a path extending from the free-form fold mirror to a screen intersection, where the free-form fold mirror is interposed between the projector and the simulator screen and the free-form fold mirror includes a first curved portion, a second curved portion spaced from the first curved portion, and a first flat portion.

21. The method for projecting an image as recited in claim 20, wherein the free-form mirror further includes a second flat portion, wherein the first curved portion is between the first flat portion and the second flat portion.

22. The method for projecting an image as recited in claim 20, wherein the first flat portion is between the first curved portion and the second curved portion.

23. The method for projecting an image as recited in claim 22, wherein the first curved portion has a concave cross-sectional shape with respect to the simulator screen.

24. The method for projecting an image as recited in claim 22, wherein the first curved portion has a concave cross-sectional shape with respect to the simulator screen and the second curved portion has a convex cross-sectional shape with respect to the simulator screen.

25. The method for projecting an image as recited in claim 20, wherein the projector is configured to project a high definition image.

26. The method for projecting and image as recited in claim 20, wherein the simulator screen is curved.

27. The method for projecting an image as recited in claim 20, wherein the first curved portion is positioned to affect an edge of the image from the projector.

28. The method for projecting an image as recited in claim 20, further comprising:
projecting the image from the projector along a second projection path extending from the image projection source of the projector to a second mirror intersection with a flat fold mirror; and
reflecting the projected image from the flat fold mirror along a second path extending from the flat fold mirror to a second screen intersection, where the flat fold mirror is interposed between the projector and the simulator screen.

29. The method for projecting an image as recited in claim 28, wherein the free-form fold mirror and the flat fold mirror are slidably connected to a frame to allow for selection of one of the free-form fold mirror and the flat fold mirror for reflecting the image to the simulator screen.

30. The method for projecting an image as recited in claim 29, further comprising:
slidably selecting one of the free-form fold mirror and the flat fold mirror.

\* \* \* \* \*